United States Patent
MacGovern

[11] 3,812,352
[45] May 21, 1974

[54] ENCODER READOUT SYSTEM
[75] Inventor: Alan J. MacGovern, Acton, Mass.
[73] Assignee: Itek Corporation, Lexington, Mass.
[22] Filed: Aug. 28, 1972
[21] Appl. No.: 284,382

[52] U.S. Cl............................ 250/237 G, 356/169
[51] Int. Cl......................... G01b 11/04, H01j 5/02
[58] Field of Search................. 250/237 G; 356/169

[56] References Cited
OTHER PUBLICATIONS
Burch, J. M., "The Possibilities of Moire–Fringe Interferometry," Interferometry, A Symposium Held at the National Physical Laboratory on 9th, 10th, 11th June, 1959, Her Majesty's Stationery Office, 1960, title page, page 181, 198–200 relied upon.

Primary Examiner—Archie R. Borchelt
Assistant Examiner—T. N. Grigsby
Attorney, Agent, or Firm—Homer O. Blair; Robert L. Nathano; William C. Roch

[57] ABSTRACT

A system for reading out positional information from a linear or rotary encoder based on an extension of the pinhole imaging theory to include the effects of diffraction in the encoder. In a typical encoder, light from a radiation source is directed first through a code plate having thereon periodic markings of alternating transparent and opaque increments, then through a slit plate also having thereon periodic markings of alternating transparent and opaque increments, and then upon a detector. According to the teachings of this invention there are optimal positions for the encoder plate, the slit plate and the detector to obtain maximum readout signals from the encoder. These optimal positions are selected in theory according to two relationships which must be simultaneously satisfied, namely: $Z_1 = nS_1S_2/\lambda$, and $Z_1 = (S_1 - S_2)Z_2/S_2$ where n is an integer of one or greater, $\lambda$ is the mean wavelength of the light source, $S_1$ is the length of one clear increment-opaque increment period in the code plate, $S_2$ is the length of one clear increment-opaque increment period in the slit plate, $Z_1$ is the distance between the code plate periodic markings and the slit plate periodic markings, and $Z_2$ is the distance between the detector and the periodic markings on the slit plate.

16 Claims, 6 Drawing Figures

ENCODER READOUT SYSTEM

BACKGROUND OF THE INVENTION

The present invention relates generally to analog to digital encoders for converting an analog rotary or linear movement into a digital signal representative of that movement. More particularly, the present invention relates to a new and improved readout system for such an encoder wherein all of the elements in the readout system are optimally positioned, in theory, according to two relationships which must be satisfied.

In the field of analog to digital encoders, it has been the general practice to position the components of the readout system according to an equation derived from pinhole imaging theory, namely:

$$Z_1 = (S_1 - S_2) Z_2 / S_2$$

wherein $Z_1$ equals the distance between the encoder track on the code plate and the encoder track on the slit plate, $Z_2$ equals the distance between the encoder track on the slit plate and the detector, $S_1$ is the length of one clear increment-opaque increment period on the code plate, and $S_2$ is the length of one clear increment-opaque increment period on the slit plate. Such prior art readout systems have been somewhat unsatisfactory in that they resulted in encoders wherein the encoder code plate and the encoder slit plate were placed as close to each other as possible and typically one to five thousandths of an inch apart. Such a small gap meant tolerances had to be very tight in the encoder which resulted in a more expensive product. Also with such a small gap, any dust or foreign particles in the encoder presented problems as they might lodge between the two plates and scratch the encoder tracks. Further, with such a prior art setup much of the readout signal was lost due to diffraction effects in the encoder.

The present invention results in an encoder readout station with a rather large gap between the code and slit plates. There is a type of readout station in the prior art which also has a rather large gap between the code and slit plates. This type of prior art readout station utilizes collimated light and Fresnel imaging, and operates on a distinctly different principle from the present invention which works well with either collimated or noncollimated light sources.

SUMMARY OF THE INVENTION

In accordance with a preferred embodiment, a system for reading out positional information from linear or rotary encoders is disclosed which is based on an extension of the prior art pinhole imaging theory to include diffraction effects.

In accordance with a preferred embodiment, a radiation source having a wavelength $\lambda$ is arranged to illuminate a first plate having thereon periodic markings of alternating clear and opaque increments, with the length of one clear increment-opaque increment period being $S_1$. A second plate is positioned behind the first plate with the second plate having thereon periodic markings of alternating increments, with the length of one increment period being $S_2$. A detector is positioned to detect radiation modulated by the first and second plates. The first and second plates and the detector are, in theory, positioned according to the following two relationships:

$$Z_1 = n S_1 S_2 / \lambda, \text{ and } Z_1 = (S_1 - S_2) Z_2 / S_2$$

wherein $S_1$, $S_2$ and $\lambda$ are as defined above, $Z_1$ equals the distance between the first plate periodic markings and the second plate periodic markings, $Z_2$ equals the distance between the second plate periodic markings and the detector, and $n$ equals an integer of one or greater.

While in a typical encoder light is directed first through a code plate, then through a slit plate, and finally onto the detector, other embodiments of encoders might be built having light directed first through the slit plate, then through the code plate and finally onto a detector. The teachings of this invention are applicable to all such embodiments, as long as the spacing between the first and second plates and the detector are substantially as set forth in the previous paragraph.

While the preferred embodiment is illustrated as an encoder wherein light from a radiation source is directed through first and second plates, each having alternating clear increment-opaque increment cycles, and then onto a photodetector, other embodiments might be built wherein light from a radiation source is directed through a transmissive first plate onto a second plate having alternating reflective and absorptive increments. The teachings of this invention are applicable to such an embodiment, with the only other modification being that the detector (positioned according to $Z_2$) would be on the opposite side of the second plate.

An encoder built according to the teachings of this invention has the advantages of allowing much larger gaps and looser tolerances between the encoder code and slit plates while obtaining better modulation of the positional signal out of the encoder. The larger encoder gap means that the encoder is more tolerant to dirt and dust in the encoder as the foreign particles are less likely to lodge between the code and slit plates and scratch the encoder tracks thereon. Also, the wider gap and looser tolerances simplify assembly, and result in a more reasonably priced encoder. Also, very significantly, an encoder built according to the teachings of this invention utilizes the effects of diffraction in the encoder to its advantage rather than having diffraction degrade the performance of the encoder. The improved positional signal modulation allows the reading of finer code tracks than is presently possible with pinhole imaging systems, and it is conjectured that this invention may allow the reading of encoder tracks up to eight times as fine as it is presently possible to read with spatially incoherent light sources.

DESCRIPTION OF A PREFERRED EMBODIMENT

Figure 1:
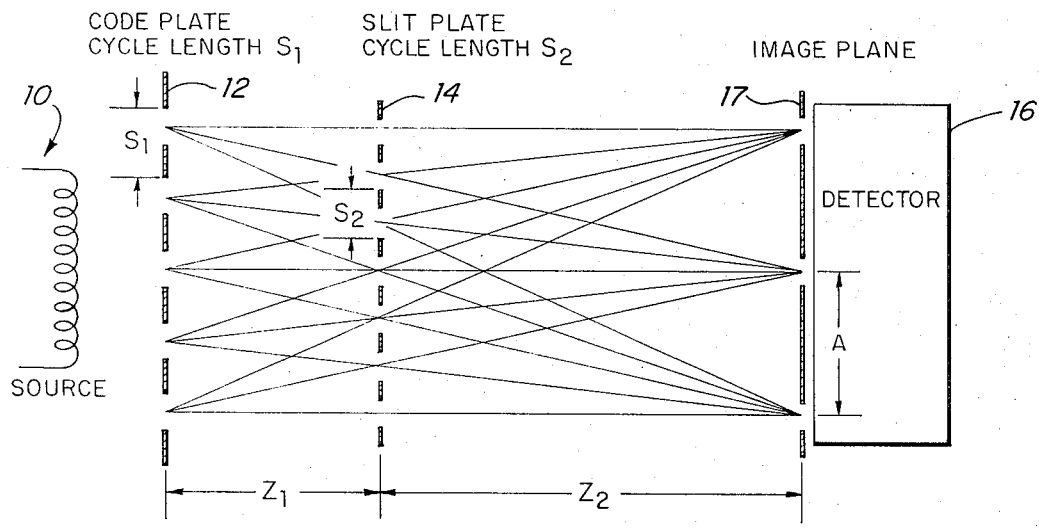
FIG. 1 illustrates the theory of pinhole imaging in an encoder readout system.

FIG. 1 illustrates geometrically the prior art theory of pinhole imaging in an encoder readout system. A light source 10 illuminates a periodic grating 12 which is the encoder track on the code plate. Light passing through the periodic grating 12 then passes through a periodic grating 14 which is the encoder track on the slit plate, and is then directed back to a detector 16 positioned behind a bottom slit grating 17. In alternative embodiments of the prior art, the one detector 16 and bottom slit grating 17 are replaced by an array of small detectors, the outputs of which are summed. According to pinhole imaging theory, essentially each aperture in the slit plate produces a pinhole image of the code plate. At a certain distance ZZ from the slit plate, the images from all the apertures fall on top of each other giving a magnified overall image of the code plate. From this geometry the following equation has been derived and is generally known in the art:

$Z_2 = S_2/(S_1-S_2) \cdot Z_1$, wherein $S_1$ is the length of a clear increment-opaque period on the code plate, $S_2$ equals the length of a clear increment-opaque increment period on the slit plate, $Z_1$ equals the distance between the code plate periodic markings and the slit plate periodic markings, $Z_2$ equals the distance between the slit plate periodic markings and the detector, and A is the distance between the images at the image plane. A detector is placed in the image plane, and detects the motion of the code plate with respect to the slit plate. The detector is placed behind a bottom slit grating having apertures which are small compared to the distance A. The image of the code plate is magnified at the detector by the amount $A/S_1$ or $Z_2/Z_1$.

In a typical prior art encoder $S_1$ and $S_2$ might differ by approximately 1 percent such that $Z_2$ equals 100 $Z_1$ and the magnification equals 100. With a code plate to slit plate spacing of 0.002 inches the detector would be 0.2 inches behind the slit plate. Based purely on geometry, one would expect that the spacing could be increased to perhaps 0.01 inches and the detector moved back to one inch, and that satisfactory results would still be obtained. In general this has not been born out in practice and is a false expectation as the simple geometrical treatment by the prior art does not take into account diffraction.

The present invention is the result of the application of diffraction theory to pinhole imaging theory. The present invention results in some surprising conclusions and encoder readout systems which are superior to prior systems in several respects.

The following explanation is useful to understand the effects of diffraction in encoder readout systems.

Figure 2:
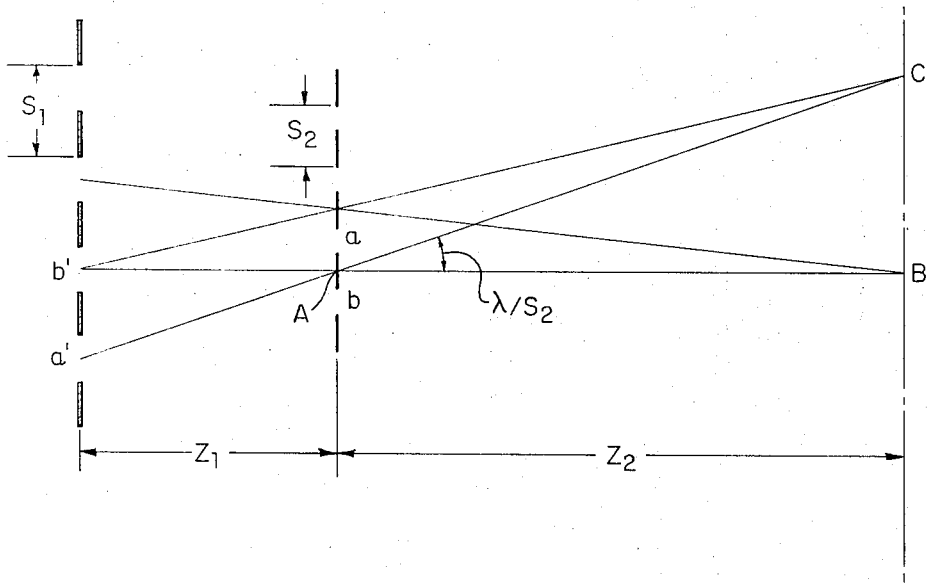
FIG. 2 shows the emanation of interference bands from a slit plate.

Referring to FIG. 2, consider light reaching two adjacent apertures $a$ and $b$ in the slit plate from a particular aperture $a'$ in the code plate. In a manner similar to that of Young's double slit experiments, interference bands emanate to the right apparently from a point between the two apertures of the slit plate. The lines AC and AB represent the zero and minus first order of these interference bands. There is also a set of interference bands formed by light from adjacent code plate aperture $b'$, and AC and AB represent respectively the plus first order and zero order of this interference pattern. From simple diffraction theory for small angles, the angle CAB is $\lambda/S_2$ where $\lambda$ is the source mean wavelength and $S_2$ is the slit plate cycle length. From geometry it then follows that $S_1/Z_1 = \lambda/S_2$, and therefore $Z_1 = S_1S_2/\lambda$ In fact this equation can be generalized to $$Z_1 = nS_1S_2/\lambda \text{ wherein } n = 0, 1, 2, 3...$$

(1)

The results of pinhole imaging theory are still valid, and so also $$Z_1 = (S_1-S_2)Z_2/S_2$$

(2)

Thus, this invention results in a realization that there are two equations for $Z_1$ which must be simultaneously satisfied to obtain the theoretically optimal positions for the encoder plate, the slit plate and the detectors.

The inventor has also derived equation (1) above a mathematical analysis of the effects of diffraction in encoder readout systems. The Huyghens-Fresnel diffraction integrel was applied to obtain the optical transfer function for a generalized object illuminated incoherently and transmitted by some aperture. The resultant transfer function agreed precisely with that derived by another approach by Swing and Rooney, J. O. S. A., May 1968, Vol. 58, No. 5, p. 629. Applying the transfer function to the specific situation of optical encoders leads to equations (1) and (2) as being appropriate for optimal modulation of the output.

It is interesting to note that when the integer $n = 0$ is placed in equation (1), the approach results in the same approach being persued by the prior art wherein the spacing between the code and slit plates is kept as small as possible. With a very narrow gap (with $n = 0$) the effects of diffraction are not significant.

Using equation (1) for a typical encoder situation in which $S_1 = 25$ microns, $S_2 = 0.99S_1$, $\sim S_1$, $\lambda = 1$ micron, and for an integer $n = 1$, $Z_1 \sim S_1^2/\lambda = 625$ microns or about 0.025 inches. The distance $Z_2$ to the image plane would then be 2.5 inches, which is somewhat larger than would be convenient. The distance $Z_2$ might be reduced by decreasing the ratio of $S_2$ to $S_1$ which would also result in a consequent reduction in magnification. Reduction in magnification might cause the fringes in the image plane to be sufficiently close together to require the use of a bottom slit grating in the image plane.

Figure 5:
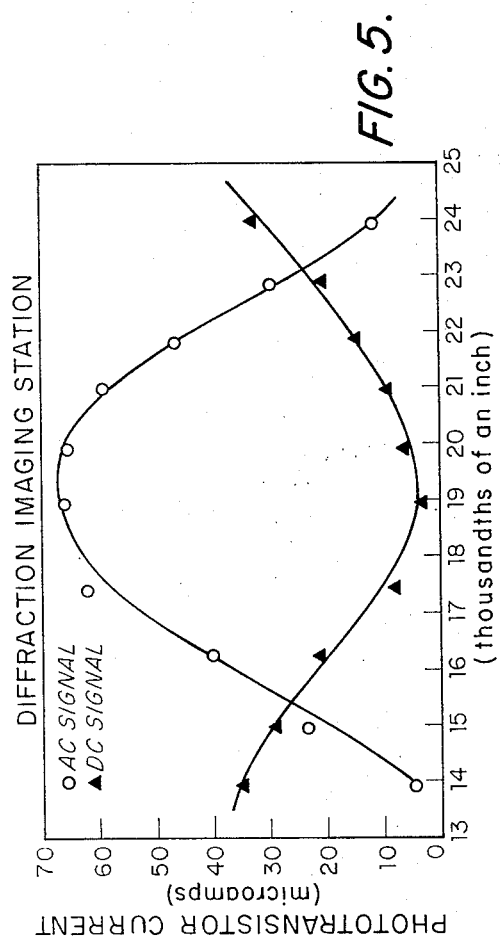
FIG. 5 illustrates a graph of the measured AC and DC signals versus the slit to code plates gap for an encoder built according to the teachings of this invention.
Figure 6:
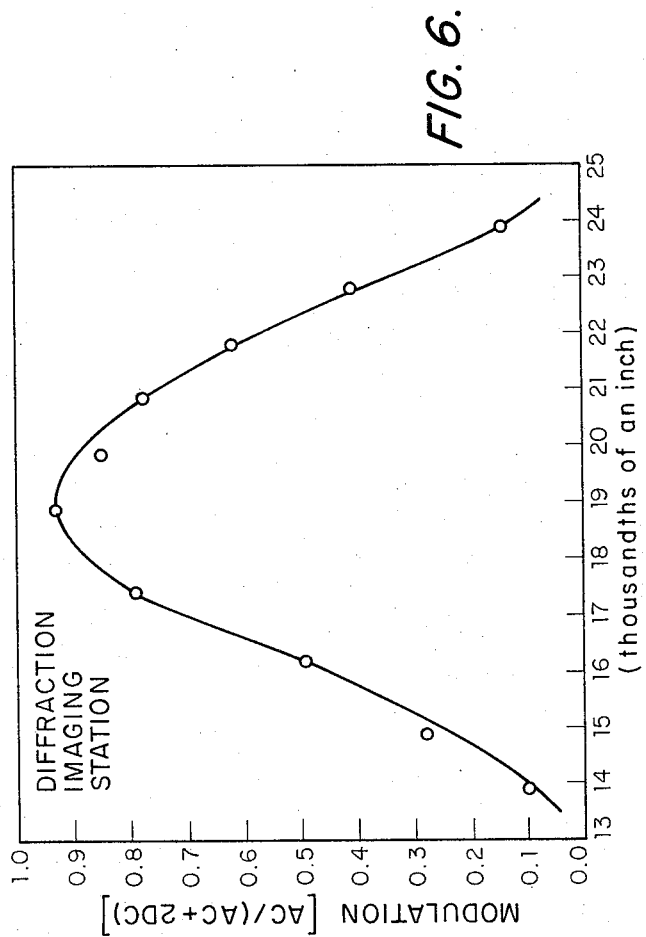
FIG. 6 illustrates a graph of signal modulation versus the slit to code plates gap for an encoder built according to the teachings of this invention.
Figure 3:
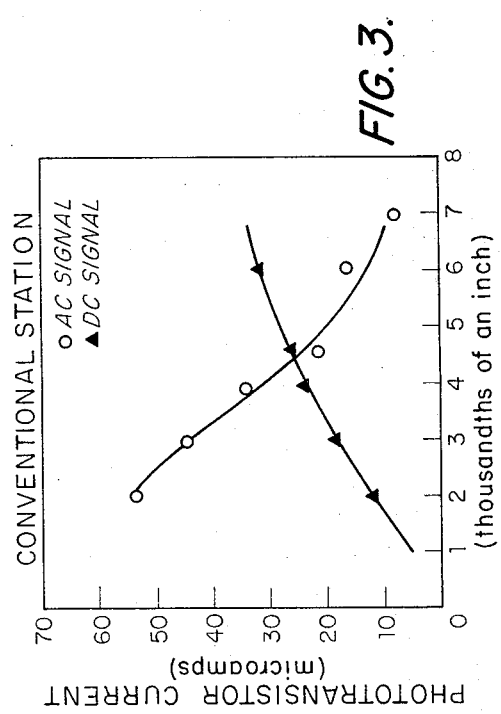
FIG. 3 illustrates a graph of the measured AC and DC signals versus the slit to code plates gap for a prior art encoder.
Figure 4:
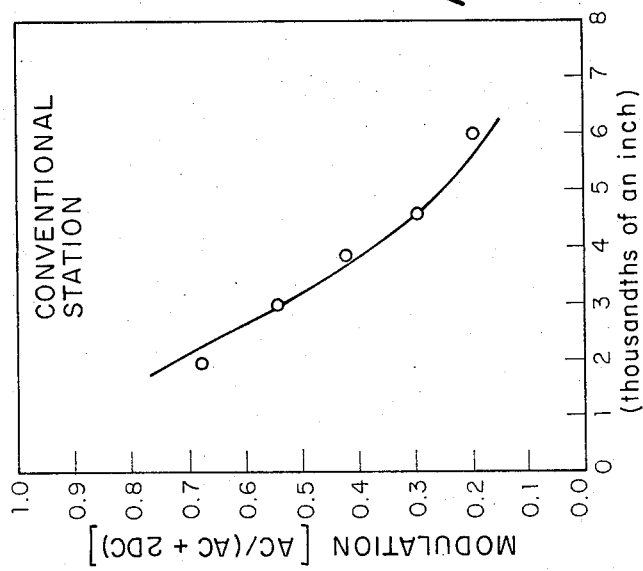
FIG. 4 illustrates a graph of signal modulation versus the slit to code plates gap for a typical prior art encoder.

FIGS. 3 and 4 illustrate graphs of measurements of an encoder readout station built according to the conventional pinhole imaging theory, and FIGS. 5 and 6 illustrate graphs of measurements of the same encoder readout station positioned according to the teachings of this invention, with the integer $n$ equal to 1. The readout station utilized in these measurements had a light source consisting of a gallium arsenide light emitting diode having a mean wavelength $\lambda$ of about 0.93 microns. $S_1$ was 24.9 microns, $S_2$ was 22.2 microns, and the utilized detectors were phototransistors.

FIG. 3 illustrates a graph of that readout station while utilizing just pinhole imaging theory. The graph is of the detector AC and DC currents in microamps versus the distance $S_1$ between the code and slit plates. In an encoder, one would like to maximize the AC signal, which gives useful positional information, and minimize the DC signal, which is essentially noise. As shown by FIG. 3, the AC current was maximum and the DC current a minimum at the smallest distance between the code and slit plates. FIG. 4 illustrates the modulation of current for the same readout station, which modulation is defined as the AC current over the AC & 2DC currents. In an encoder one would like to maximize the signal modulation, and as expected and shown by FIG. 4, the best results were obtained with the minimum gap between the code and slit plates.

Typically, one would like a signal modulation of at least 0.5 and a gap between the code and slit plates of no less than two thousandths of an inch. Accordingly, with an encoder readout station having the characteristics set forth in FIG. 4, the code to slit plate gap would have to be maintained between 2 and 3.2 thousandths of an inch.

FIGS. 5 and 6 illustrate graphs of measurements of the same encoder readout station positioned according to the teachings of this invention. Utilizing equations (1) and (2) above and with the integer $n=1$, one would expect optimum results at a slit to code plate gap of 0.023 inches. As shown by FIG. 5, the maximum AC signal and the minimum DC signal was obtained at just slightly greater than 0.019 inches. The slight discrepancy between the theoretically expected optimum gap and the gap at which the best signals were obtained may be due to any of the following. The mean wavelength of the light source might not have been at the anticipated wavelength of 0.93 microns. The code and slit plates were for a rotary encoder wherein the encoder tracks have a configuration with the increment periods varying from the outer radius to the inner radius, while the theory was worked out for a linear configuration wherein the increment periods are fixed. Also, it is possible that the mathematical derivation referred to above might not have been rigorous enough, and possibly a more rigorous derivation might result in several extra terms having a slight effect on the anticipated optimal gap for $Z_1$. Also, it is possible that the discrepancy may have been caused by phase corrugations in the emulsion which were not accounted for in the derivation. In any event, the measured results are substantially the same as predicted by equations 1 and 2 above. Perhaps the best way to design an encoder while utilizing the teachings of this invention would be to position the code to slit plate gap according to the theoretically expected position, then empirically measure the output of the encoder at slightly different gaps, and then select the gap giving the optimum results.

Referring back to FIG. 5 and 6 and comparing the results shown therein with the results shown in FIGS. 3 and 4, the following significant differences can be seen.

The first significant difference is that a readout station constructed in accordance with the prior art would have a mean code plate to slit plate gap of approximately 0.0026 inches, whereas a readout station constructed according to the teachings of this invention would have a mean gap around 0.019 inches. With a mean gap of 0.0026 inches, excessive play between the two plates might have dire results as any contact between the plates might scratch the encoder tracks located thereon. Also, any foreign particles in the encoder might lodge between the plates, and result in scratched encoder tracks. This difficulty is obviously removed when the mean encoder gap may be maintained at 0.019 inches.

A second significant difference is the range through which the slit to code plate gap might vary. As mentioned before, the prior art readout station would probably be designed to operate between 0.002 and 0.0032 inches. Referring to FIG. 6 and the characteristics of a readout station constructed according to this invention, it may be seen that a signal modulation of 0.5 is present over the range of 0.0162 to 0.0228 inches. This presents a range of 0.0062 inches through which the encoder gap might vary. When comparing this with 0.0012 inches of the prior art, one sees that the range is expanded by several hundred percent with the present invention, which is indeed a significant improvement.

A third evident advantage of a readout station constructed according to this invention is that the encoder gap might be designed to be very close to 0.019 inches wherein the signal modulation is above 0.9. In the prior art a signal modulation of this magnitude is almost impossible to obtain as the encoder gap would have to be held around 0.001 inches. The very low tolerances which would be required to operate with such an encoder gap would make the cost of the encoder extremely expensive. Thus, an encoder built according to the teachings of this invention results in better signal modulation, while allowing the encoder to be built to less stringent tolerances. The result is a better encoder at less cost.

The above example illustrates how the teachings of this invention may be utilized to build an encoder which requires substantially less stringent tolerances than an encoder built according to the prior art. On the other hand, if tolerances of the prior art were adhered to, the teachings of this invention might be utilized to build an encoder capable of reading out much finer positional information than the prior art. For example, in the equation above, $Z_1 = n\, S_1 S_2/\lambda$. In most instances $S_1 \cong S_2$, so that the equation may be generalized to $S_1 = nS_1^2/\lambda$. If $S_1$ were made twice as fine (i.e., $S_1/2$), $S_1^2$ in the above equation would cause $Z_1$ to be reduced by one fourth. Thus, in the above example if the code track $S_1$ were made twice as fine, the calculated value for $Z_1$ would be 0.00575 inches. The inventor has in fact carried out such an experiment, and measurements of the encoder output indicate that the best results are obtained at 0.00475 inches, which is substantially the value predicted by the above equations.

The preferred emodiment is illustrated as a transmissive encoder wherein light from a radiation source is directed through first and second plates, each having alternating clear increment-opaque increment cycles, and then onto a photodetector. In another embodiment, the teachings of this invention may be applied to an encoder wherein light from a radiation source is directed through a transmissive first plate onto a second plate having alternating reflective and absorptive increments. The radiation would then be selectively reflected by the second plate onto a detector. In such an embodiment, the detector (positioned according to $Z_2$) would be on the opposite side of the second plate.

While several embodiments have been described, the teachings of this invention will suggest many other embodiments to those skilled in the art.

I claim:

1. In an encoder which measures the movement of a first plate, having thereon periodic markings of alternating transparent and opaque increments, relative to a second plate, having thereon periodic markings of alternating increments, the improvement comprising the encoder and the readout system in the encoder being optimally designed while taking into account diffraction effects of radiation in the encoder and comprising:

a. a first plate having thereon periodic markings of alternating transparent and opaque increments, with the length of one clear increment-opaque increment period being $S_1$;
b. a second plate having thereon periodic markings of alternating increments, with the length of one alternating increment period being $S_2$;
c. a radiation source means for producing radiation having a mean wavelength $\lambda$ and for directing it first through said first plate and then onto said second plate, with relative movement between said first plate and said second plate causing modulation of the radiation;
d. a detector means for detecting modulation of the radiation by said first and second plates; and
e. means for detecting and reading relative movement between said first plate and said second plate while taking into account diffraction effects, and including means for positioning said first plate and said second plate and said detector means substantially according to the following two relationships:

$Z_1 = nS_1S_2/\lambda$, and
$Z_1 = (S_1 - S_2)Z_2/S_2$ wherein $S_1$, $S_2$, and $\lambda$ have already been defined, and wherein $Z_1$ equals the distance between the first plate periodic markings and the second plate periodic markings, $Z_2$ equals the distance between said detector means and the periodic markings on said second plate, and $n$ equals an integer of one or greater.

2. An encoder as set forth in claim 1 wherein said second plate has periodic markings of alternating transparent and opaque increments.

3. A system as set forth in claim 1 wherein $n$ equals one.

4. An encoder as set forth in claim 1 wherein $n$ equals two.

5. An encoder as set forth in claim 1 wherein the encoder is a linear encoder.

6. An encoder as set forth in claim 1 wherein the encoder is a rotary encoder.

7. An encoder as set forth in claim 1 wherein said first plate is the encoder code plate and said second plate is the encoder slit plate.

8. An encoder as set forth in claim 2 wherein the encoder is a linear encoder.

9. An encoder as set forth in claim 8 wherein said first plate is the encoder code plate and said second plate is the encoder slit plate.

10. An encoder as set forth in claim 2 wherein the encoder is a rotary encoder.

11. An encoder as set forth in claim 10 wherein said first plate is the encoder code plate and said second plate is the encoder slit plate.

12. An encoder as set forth in claim 1 wherein said second plate has periodic markings of alternating reflective and absorptive increments.

13. An encoder as set forth in claim 12 wherein the encoder is a linear encoder.

14. An encoder as set forth in claim 13 wherein said first plate is the encoder code plate and said second plate is the encoder slit plate.

15. An encoder as set forth in claim 12 wherein the encoder is a rotary encoder.

16. An encoder as set forth in claim 15 wherein said first plate is the encoder code plate and said second plate is the encoder slit plate.

* * * * *